(No Model.)
E. BAUSCH.
DIAPHRAGM AND SHUTTER FOR PHOTOGRAPHIC AND OTHER LENSES.
No. 382,858. Patented May 15, 1888.
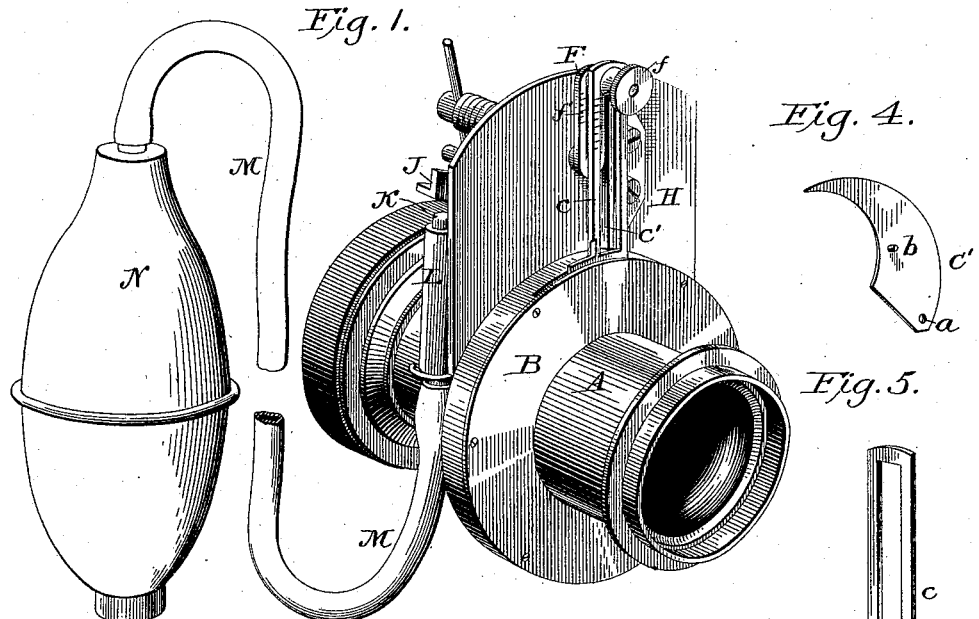
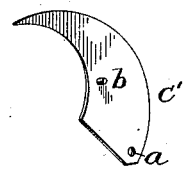
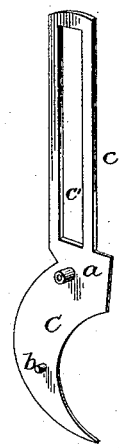
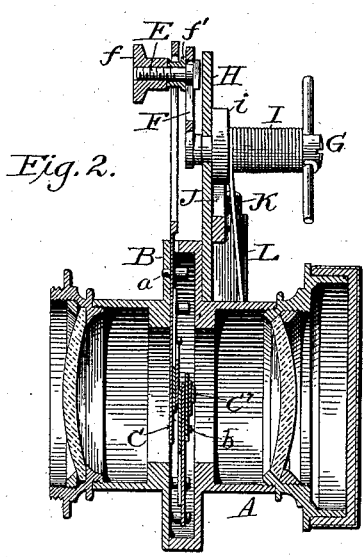
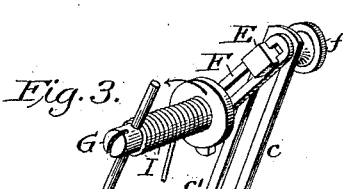
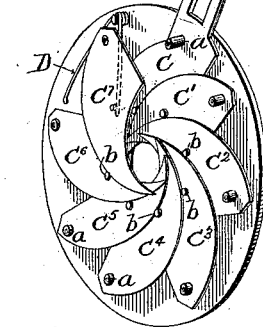
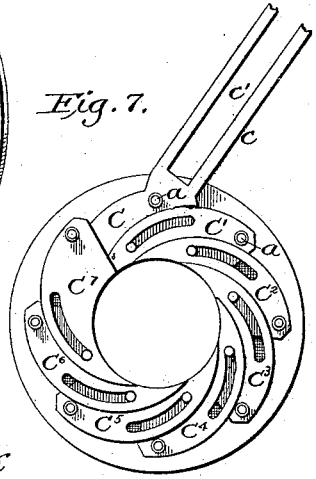
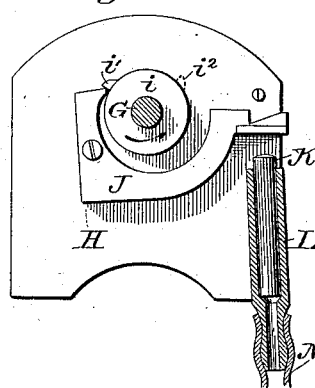
Witnesses:
James T. DuHamel
F. T. Chapman
Inventor:
Edward Bausch
By his Atty
Phil. T. Dodge

UNITED STATES PATENT OFFICE.

EDWARD BAUSCH, OF ROCHESTER, NEW YORK.

DIAPHRAGM AND SHUTTER FOR PHOTOGRAPHIC AND OTHER LENSES.

SPECIFICATION forming part of Letters Patent No. 382,858, dated May 15, 1888.

Application filed December 24, 1887. Serial No. 258,886. (No model.)

*To all whom it may concern:*

Be it known that I, EDWARD BAUSCH, of Rochester, in the county of Monroe and State of New York, have invented certain Improvements in Diaphragms and Shutters for Photographic and other Lenses, of which the following is a specification.

The object of my invention is to provide a simple and reliable device which shall serve the double purpose of an adjustable diaphragm to govern the admission of light and of a shutter to open and close the aperture of the lens for the purpose of making either instantaneous or time exposures, as may be required. To this end I employ a series of pivoted blades grouped about a central opening and directly connected with each other, so that they are compelled to swing inward and outward in unison. This combination of blades or plates may be adjusted by hand either for the purpose of a diaphragm or a shutter, or both; but I prefer to combine therewith suitable spring-actuated mechanism by which they may be caused to open and immediately reclose to make instantaneous exposures, and I have therefore represented such devices in the accompanying drawings. I have also provided, in connection with said operative devices, means whereby the extent of the opening for the purpose of exposure may be adjusted at will, as the light of the subject may render advisable.

In the accompanying drawings, Figure 1 is a perspective view of a photographic lens with my improved shutter combined therewith. Fig. 2 is a vertical axial section of the same. Fig. 3 is a perspective view showing the internal portions of the shutter, together with the external devices for operating the same, the supporting-frame and other parts being omitted. Figs. 4 and 5 are perspective views of two blades of the series composing the shutter proper. Fig. 6 is a face view of the device for pneumatically releasing the shutter. Fig. 7 is a face view illustrating the shutter in its preferred and most highly-developed form.

Referring to the drawings, A represents the tube or body in which the lenses are mounted, as usual. I provide this body at its center with a hollow annular enlargement or ring, B, opening internally into the tube. Within this ring I pivot a series of flat plates or blades, C C', &c., which serve, jointly, the purpose of a shutter and an adjustable diaphragm. The plates are made of the form represented in the drawings, or of any other appropriate form which will answer the same purpose, and are grouped around the central opening of the tube in the manner shown, each plate being mounted at the outer corner of its individual pivot $a$, so that it may swing inward across or outward beyond the bore of the tube or body. Each plate overlaps the next at one edge, as shown in the drawings, and they are so formed and arranged that by turning them inward and outward in unison they may be caused to completely close the tube, and thus serve the purpose of a shutter, or to afford a central opening of any required size between their inner edges, whereby they are enabled to serve the purpose of an adjustable diaphragm or a diaphragm with an adjustable central opening to regulate the admission of light. Each of the blades carries on one face a stud or pin, $b$, which rides against the outer edge of the next blade for the purpose of imparting motion thereto. When, therefore, an inward movement is communicated to the blade C at one end of the series, it will communicate motion through its stud to the second, the second to the third, and so on throughout the series, the blades closing inward simultaneously and uniformly around the central opening. On the other hand, if an outward motion be imparted to the blade $C^7$ at the other end of series, it will urge outward the blade $C^6$, which will in turn urge outward the blade $C^5$, and so on throughout the series, the blades being thus caused to open simultaneously and equally.

From the foregoing it will be understood that each blade serves through its stud to impart motion directly to the next blade in the series, either inward or outward, according as the shutter is being opened or closed. A spring, D, secured to the frame or other support, acts at one end against the blade $C^7$ in an outward direction, this outward pressure being communicated from one blade to another throughout the series, so that there is a constant tendency on the part of the shutter to open when released.

The blade C is extended in the form of an arm, c, provided with a longitudinal slot, c'. This slot receives the adjustable crank-pin E of a slotted crank, F, fixed on one end of a horizontal shaft, G. This shaft is mounted in a stationary plate, H, extended upward from the body, and is encircled by a spring, I, which tends constantly to turn the shaft in the direction indicated by the arrow, and thus effect the closing of the shutter. The shaft is provided with a hub, i, having a shoulder, i', and the frame is provided with a pivoted lever, J, adapted at one end to engage the shoulder i. At the opposite end this lever bears upon a piston, K, mounted in the upper end of a stationary cylinder, L, which is connected by a flexible tube, M, with a compressible bulb, N. The crank stands normally in its upper position with the shutter closed.

To set the shutter for action it is only necessary to turn the shaft G a half-revolution to the right until the arm J engages the shoulder i to hold the parts in their new positions. During the first quarter of the revolution of the shaft its crank F throws the arm c to the right and causes the plates to open outward; but as the crank advances through the second quarter-revolution it returns the parts to their original positions. On compressing the bulb the plunger trips the lever J out of engagement with shoulder i, whereupon the spring immediately turns the shaft and crank backward to their original positions, vibrating the arm C quickly and causing the shutter to open and close. The size of the aperture produced by the opening of the shutter is controlled by adjusting the throw of the crank—the longer the throw the greater the movement of the plates and the larger the aperture. To permit this adjustment the crank-pin, suitably headed, is passed through a slot in the crank and through the slotted arm, and provided with a thumb-screw, f, and a collar, f', by which it may be locked fast to the crank at any required distance from the axis.

If it be desired to hold the shutter in an open position to permit the focusing of the lens, a second shoulder, i², may be provided on the disk, as shown in dotted lines in Fig. 6, or in any other suitable means provided for holding the parts temporarily in the required position.

In order that the size of the central aperture may be definitely adjusted, I propose to provide the crank-arm with a series of graduations, as shown at f', or to provide similar graduations on the arm c.

While I prefer to employ the devices herein shown for operating the shutter properly, it is to be understood that I may substitute for the bulb, piston, and lever J any other suitable devices for locking the shaft, and also that I may, if desired, employ in place of the crank-shaft and spring any equivalent device for imparting motion to the blades.

Instead of arranging the studs b to act against the outer edges of the blades, the latter may be slotted to receive the pins, as shown in Fig. 7, in which case any blade in the series will serve to move the others both inward and outward in a positive manner. This construction, it will be observed, is the same as that in the preceding figures, supplemented by the extension of the blades, so that they overlap the studs.

The essence of the invention resides in the combination of a series of blades which directly actuate one another, and it is manifest that in form and detail they may be variously modified without changing essentially their mode of action.

While I have represented my shutter in connection with a lens-tube, it is to be distinctly understood that it may be mounted in a separate or independent frame applicable either in front or behind the lens in the manner commonly practiced with other shutters.

It is obvious that the actuating crank and spring may be omitted and the arm c actuated by hand to move the blades, either for the purpose of a diaphragm or that of a shutter. It is also evident that the series of co-operating blades, as herein shown, may be applied in microscopes, and, generally, in all optical instruments requiring an aperture to be closed or varied in size.

I do not claim, broadly, a series of pivoted overlapping leaves or blades grouped around a central opening, as I am aware that blades so arranged and pivoted have been connected to and operated by means of a rotary ring, as represented, for example, in Letters Patent of the United States granted to Harrison and Schnitzer. My construction is advantageous, in that it wholly dispenses with the connecting-ring and avoids the evils incident to its use. I believe myself to be the first to so connect a series of pivoted blades that motion is communicated directly from one to another throughout the series.

Having thus described my invention, what I claim is—

1. In combination with a suitable body or support having an opening therethrough, the series of pivoted blades grouped around said opening and each engaging directly with and actuating the next, substantially as described and shown.

2. In combination with a suitable body or support, the pivoted overlapping blades grouped around said opening, and each provided with a stud or projection to act directly on the next, in combination with a spring tending to move said blades in one direction on their pivots.

3. In combination with a suitable body or support, the series of pivoted overlapping blades directly connected by studs and slots, as shown, whereby they are caused to move inward and outward in unison.

4. In combination with a series of pivoted connected blades adapted to swing inward and outward across a central opening, an arm extended from one of said plates, a crank acting on said arm, a spring to turn the crank, and a detent to hold the crank against the stress of the spring.

5. The series of pivoted blades grouped around a central opening and acting each to move the next, in combination with the spring tending to close the blades, the slotted arm $c$, the slotted crank, the adjustable crank-pin, the crank-actuating spring, and the detent-lever.

6. In combination with a series of movable blades pivoted around the periphery of a central opening and adapted to swing inward and outward across the same, an arm arranged to operate the said blades, a crank acting on said arm, a spring to turn the crank, and a detent to hold the crank against the stress of the spring, substantially as and for the purposes described.

In testimony whereof I hereunto set my hand, this 12th day of December, 1887, in the presence of two attesting witnesses.

EDWARD BAUSCH.

Witnesses:
 HENRY BAUSCH,
 CARL F. LOMB.